(12) United States Patent
Ali et al.

(10) Patent No.: US 9,509,214 B2
(45) Date of Patent: Nov. 29, 2016

(54) VOLTAGE REGULATOR WITH ADAPTIVE CONTROL

(75) Inventors: Isaac Ali, Mississauga (CA); Nicholas P. Cowley, Wroughton (GB)

(73) Assignee: Intel Corporation, Santa Clara, CA (US)

(*) Notice: Subject to any disclaimer, the term of this patent is extended or adjusted under 35 U.S.C. 154(b) by 180 days.

(21) Appl. No.: 13/997,712

(22) PCT Filed: May 1, 2012

(86) PCT No.: PCT/US2012/036014
§ 371 (c)(1),
(2), (4) Date: Mar. 26, 2014

(87) PCT Pub. No.: WO2013/165401
PCT Pub. Date: Nov. 7, 2013

(65) Prior Publication Data
US 2014/0320102 A1    Oct. 30, 2014

(51) Int. Cl.
*H02M 3/10* (2006.01)
*H02M 3/157* (2006.01)
(Continued)

(52) U.S. Cl.
CPC .............. *H02M 3/10* (2013.01); *H02M 3/157* (2013.01); *H02M 2001/0025* (2013.01); *H02M 2003/1566* (2013.01)

(58) Field of Classification Search
CPC ......... H02M 2001/0025; H02M 1/44; H02M 3/156; H02M 3/157; H02M 3/10; H02M 2003/1566
See application file for complete search history.

(56) References Cited

U.S. PATENT DOCUMENTS

| | | | |
|---|---|---|---|
| 2005/0237083 A1 | 10/2005 | Bakker et al. | |
| 2006/0044852 A1* | 3/2006 | Suzuki ................ | B62D 5/046 363/59 |

(Continued)

FOREIGN PATENT DOCUMENTS

WO    2013/165401 A1    11/2013

OTHER PUBLICATIONS

International Search Report and Written Opinion received for PCT Patent Application No. PCT/US2012/036014, mailed on Feb. 1, 2013, 11 Pages.
(Continued)

*Primary Examiner* — Fred E Finch, III
(74) *Attorney, Agent, or Firm* — Grossman, Tucker, Perreault & Pfleger, PLLC

(57) ABSTRACT

Generally, this disclosure describes an apparatus, systems and methods for adaptively controlling a voltage regulator. The apparatus may include a differencing circuit configured to generate an error signal based on a difference between a reference voltage and the output voltage of the voltage regulator; a proportional control circuit coupled to the differencing circuit, the proportional control circuit configured to generate a control signal proportional to the error signal; a derivative control circuit coupled to the differencing circuit, the derivative control circuit configured to generate a control signal based on the derivative of the error signal; a summer circuit coupled to the proportional control circuit and the derivative control circuit, the summer circuit configured to sum the proportional control signal and the derivative control signal; a PWM signal generator circuit coupled to the summer circuit, the PWM generator circuit configured to adjust the PWM modulation based on the summed control signal; and a state monitor circuit configured to monitor the state of the output voltage and perform a gain adjustment on the proportional control signal and the derivative control signal based on the monitored state.

35 Claims, 6 Drawing Sheets

(51) Int. Cl.
*H02M 1/00* (2006.01)
*H02M 3/156* (2006.01)

(56) References Cited

U.S. PATENT DOCUMENTS

| | | |
|---|---|---|
| 2007/0182391 A1 | 8/2007 | Chapuis et al. |
| 2008/0252280 A1 | 10/2008 | Prodic et al. |
| 2009/0190375 A1* | 7/2009 | Manabe ............ H02M 3/1584 363/17 |
| 2010/0066324 A1 | 3/2010 | Peng |
| 2011/0204864 A1 | 8/2011 | Sreenivas et al. |
| 2011/0304306 A1* | 12/2011 | Galal ................. H02M 3/07 323/282 |
| 2012/0139513 A1* | 6/2012 | Sreenivas ............ H02M 3/156 323/272 |
| 2013/0119951 A1* | 5/2013 | Sreenivas ............ H02M 3/157 323/234 |
| 2013/0134951 A1* | 5/2013 | Kelly ................. H02M 3/156 323/273 |
| 2014/0043008 A1* | 2/2014 | Babazadeh ............ G05F 3/02 323/304 |

OTHER PUBLICATIONS

International Preliminary Report on Patentability and Written Opinion received for PCT Patent Application No. PCT/US2012/036014, mailed on Nov. 13, 2014, 7 pages.

* cited by examiner

VOLTAGE REGULATOR WITH ADAPTIVE CONTROL

FIELD

The present disclosure relates to voltage regulators, and more particularly, to voltage regulators with adaptive digital control loops.

BACKGROUND

Voltage regulators often employ a feedback control loop where the output voltage is compared to a reference (or desired) voltage and an error signal is generated based on the difference between the two. The error signal may then be used to adjust the output voltage. These implementations typically generate noise on the output voltage, particularly during transition periods when the output voltage is changing.

In many applications, for example involving sensitive analog circuits such as analog to digital converters, this noise may limit the performance of the circuit and so additional analog filtering is generally employed to reduce the noise level on the output voltage. The addition of an analog filter, however, results in increased space consumption by the circuit as well as increased cost which may limit the applicability of this approach, particularly in integrated power delivery systems.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
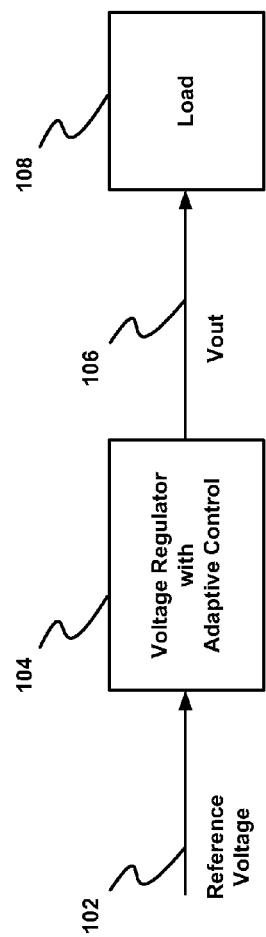
FIG. 1 illustrates a top level system diagram of one exemplary embodiment consistent with the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides apparatus, systems and methods for adaptively controlling a voltage regulator. The adaptive control may be accomplished by monitoring the output voltage of the regulator to determine if it is in a steady state or in a transition state, and adjusting the gain of the proportional and derivative control circuits of the regulator based on the monitoring. The gain adjustments, including timing and amplitude, may be programmable. The adaptive control may provide improved output response to voltage transitions while decreasing noise on the output voltage. In some embodiments, the voltage regulator may be integrated with a System on a Chip (SoC) and may provide a supply voltage to analog circuits that require a supply voltage with decreased noise levels. In further embodiments, the SoC may be part of a mobile communication device platform.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, Wireless Metropolitan Area Networks (WMAN), Wireless Wide Area Networks (WWAN), ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Some embodiments may be used in conjunction with suitable limited-range or short-range wireless communication networks, for example, "piconets", e.g., a wireless area network, a WVAN, a WPAN, and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a smartphone, a digital television, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing Wireless HDTM and/or Wireless-Gigabit-Alliance (WGA) specifications and/or future versions and/or derivatives thereof, devices and/or networks operating in accordance with existing IEEE 802.11 (IEEE 802.11-2007: Wireless LAN Medium Access Control (MAC) and Physical Layer (PHY) Specifications) standards and amendments ("the IEEE 802.11 standards"), IEEE 802.16 standards for Worldwide Interoperability for Microwave Access (Wi-MAX), Third Generation Partnership Project (3GPP) including Long Term Evolution (LTE) and Long Term Evolution Advanced (LTE-A) and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

It should be understood that the present invention may be used in a variety of applications. Although the present invention is not limited in this respect, the circuits and techniques disclosed herein may be used in many apparatuses such as stations of a radio system or nodes on a cable network. Stations intended to be included within the scope of the present invention include, by way of example only, WLAN stations, wireless personal network (WPAN), and the like.

FIG. 1 illustrates a top level system diagram 100 of one exemplary embodiment consistent with the present disclosure. A reference voltage 102 may be supplied to a voltage regulator with adaptive control 104 which provides an output voltage, Vout 106, to a load 108. In some embodiments, the voltage regulator 104 may be a Buck regulator, a Boost regulator or a Buck-Boost regulator. The load 108 may be any circuit or system that needs a supply voltage, Vout 106, for operation. In some embodiments, the voltage regulator 104 and the load 108 may be integrated on a System on a Chip. The voltage regulator 104 may adjust the output voltage, Vout 106, using an adaptive feedback control loop that compares the output to the reference, as will be described in greater detail below.

Figure 2:
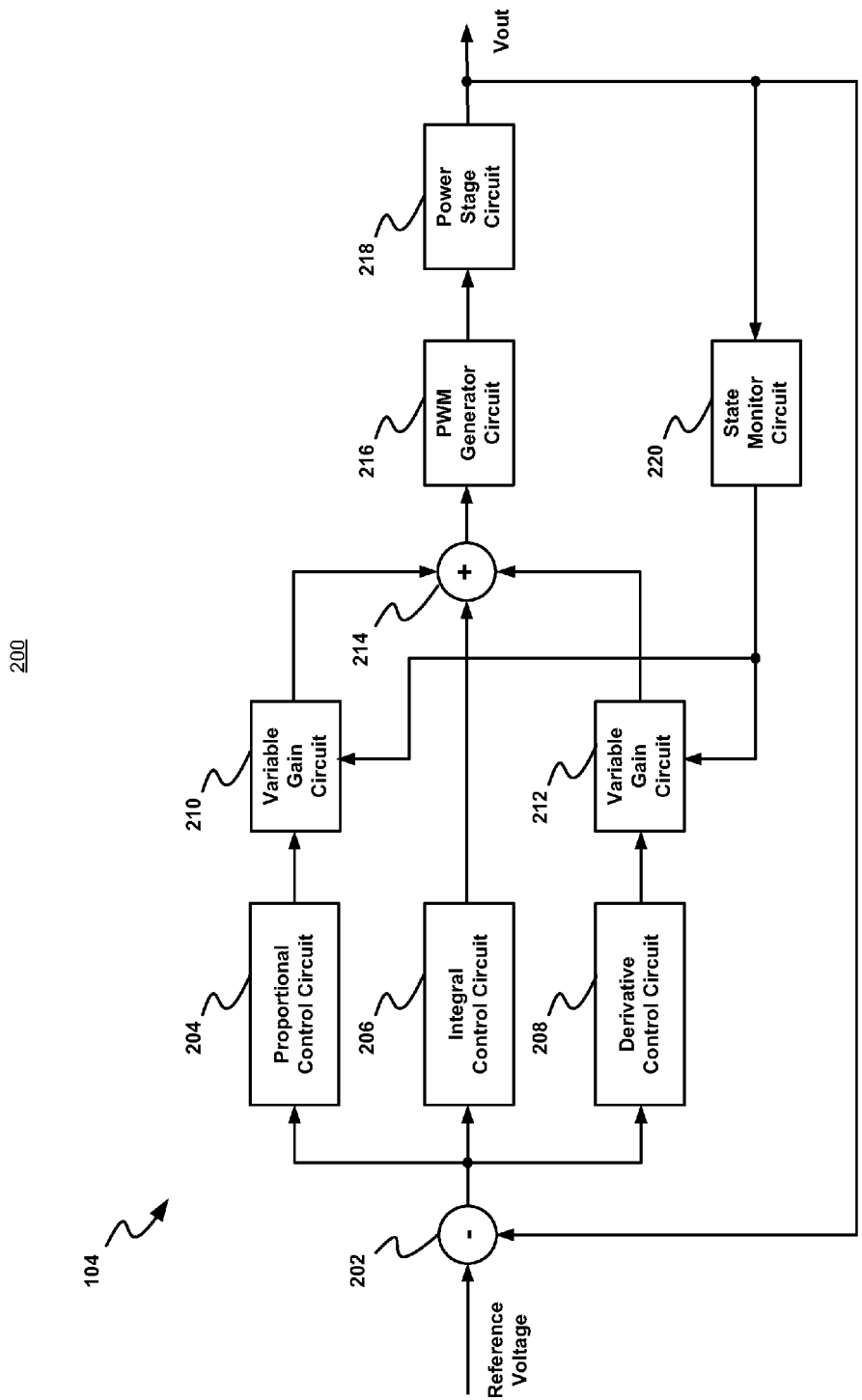
FIG. 2 illustrates a block diagram of one exemplary embodiment consistent with the present disclosure.

FIG. 2 illustrates a block diagram 200 of one exemplary embodiment consistent with the present disclosure. Voltage regulator with adaptive control 104 is shown to include a differencing circuit 202, a proportional control circuit 204, an integral control circuit 206, a derivative control circuit 208, variable gain circuits 210, 212, a summer circuit 214, a pulse width modulation (PWM) generator circuit 216, a power stage circuit 218 and a state monitor circuit 220.

Differencing circuit 202 generates a difference, or error signal, between the output voltage, Vout 106, and the reference voltage 102. The error signal may be described as $$e(t) = V\text{out} - V\text{ref},$$

and is provided to proportional control circuit 204, integral control circuit 206, and derivative control circuit 208. Proportional control circuit 204 generates a signal, Pout, which is proportional to the error signal:

$$P_{out} = G_P e(t)$$

with a scale factor $G_P$. The signal, Pout, may be considered to provide an indication of the present value of the error signal. Integral control circuit 206 generates a signal, Iout, which is proportional to the integral over time of the error signal:

$$I_{out} = G_I \int_{t_0}^{t} e(t)\, dt$$

with a scale factor $G_I$. The signal, Iout, may be considered to provide an indication of the accumulation of previous values, or history, of the error signal. Derivative control circuit 208 generates a signal, Dout, which is proportional to the derivative with respect to time of the error signal:

$$D_{out} = G_D \frac{d}{dt} e(t)$$

with a scale factor $G_D$. The signal, Dout, may be considered to provide a prediction of future values of the error signal based on the current rate of change of the error signal. The derivative, or differential, of a signal provides the basis for faster response to changing conditions but also tends to amplify noise since it acts as a high-pass filter.

Variable gain circuits 210, 212 may adjust the gains of proportional control circuit 204 and derivative control circuit 208, respectively, under the control of state monitor circuit 220, as will be explained below. In some embodiments, an additional variable gain circuit (not shown) may be provided for integral control circuit 206.

The gain adjusted control signals, Pout, Iout and Dout, are provided to summer circuit 214 which generates a composite control signal based on the sum of the three control signals. The summed control signals are provided to PWM generator circuit 216, which adjusts the modulation or duty cycle of the generated PWM signal based on the summed control signal. The PWM signal is provided to a power stage circuit 218 which generates the output voltage based on energy storage, as for example in an inductor or transformer, that is accumulated from the PWM signal.

The state monitor circuit 220 monitors the output voltage from power stage circuit 218 to determine if the voltage is in a steady state mode or in a transition mode. Steady state mode may be considered to be a state where the output voltage is restricted to a predetermined range about a given value. Transition mode maybe considered to be a state where the output voltage is transitioning between values, as for example from a current steady state to a new steady state. When state monitor circuit 220 determines that the output voltage is in a steady state, the gain for the derivative control circuit 208 may be reduced to decrease the noise level generated during steady state and thus increase the signal to noise ratio (SNR) of the circuitry powered by Vout. When state monitor circuit 220 determines that the output voltage is in a transition state, the gain for the derivative control circuit 208 may be raised to increase the corrective response provided by the differential term, enabling the system to reach a new steady state more quickly.

In some embodiments, as the derivative control circuit gain is increased, the proportional control circuit gain may be decreased. Similarly, when the derivative control circuit gain is decreased, the proportional control circuit gain may be increased In some embodiments, the amount of time taken to reach the new state, before decreasing the derivative gain, may be programmable. The gain values, as well as the rate of change for the gains, may also be programmable.

In some embodiments, the state monitor may employ one or more counters to determine the state. The counter may be pre-loaded with a programmable value at the beginning of each monitoring period. At suitable sampling intervals, the counter may be decremented if the output voltage exceeds a first predefined threshold or incremented if the counter falls below a second predefined value. The determination of steady state versus transition state may be made based on the value of the counter being within one or more predefined range of values, where each range is associated with one of the states.

Figure 3:
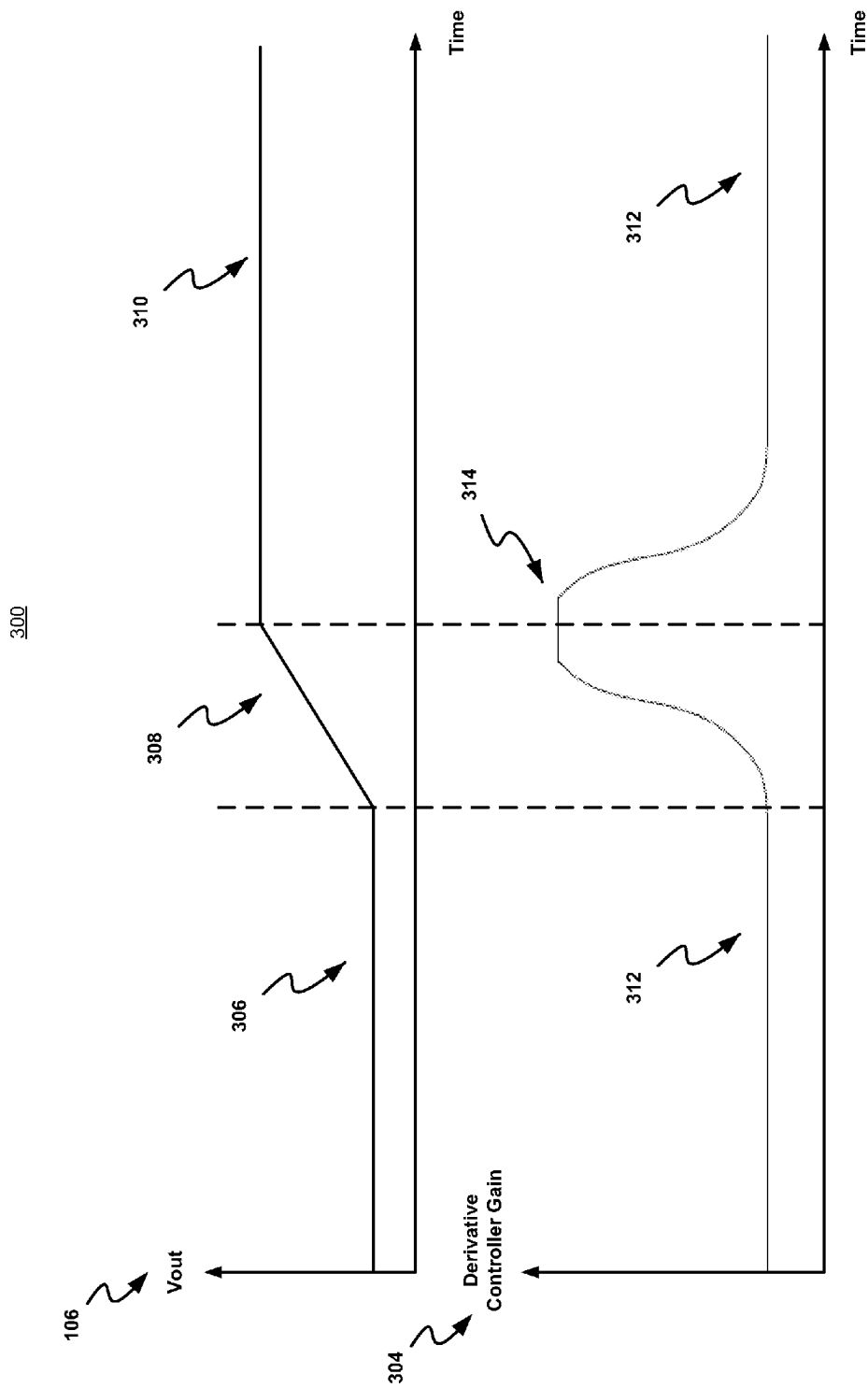
FIG. 3 illustrates signal plots associated with processing by an exemplary embodiment consistent with the present disclosure.

FIG. 3 illustrates signal plots 300 associated with processing by an exemplary embodiment consistent with the present disclosure. An example output voltage plot, Vout 106, of voltage regulator with adaptive control 104 is shown in a first steady state condition 306, followed by a transition period 308, after which a second steady state condition 310 is achieved. An example derivative control circuit gain plot 304, which may be generated in response to the output voltage 106, is shown. During the first steady state period 306, the derivative gain is held at a first lower value 312. After the transition period 308 begins, the derivative gain is increased until it reaches a second higher value 314. After the second steady period 310 begins, the derivative gain is decreased back down to the first lower value 312. The gain values as well as the rates of change associated with those gains may be programmable.

Figure 4:
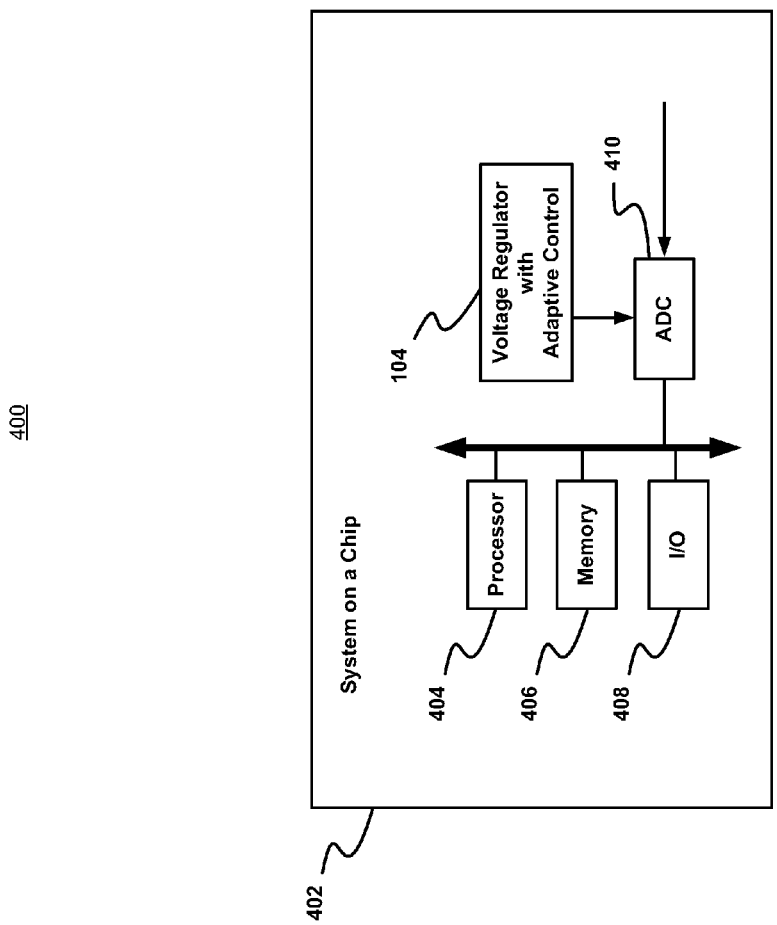
FIG. 4 illustrates a block diagram of another exemplary embodiment consistent with the present disclosure.

FIG. 4 illustrates a block diagram 400 of another exemplary embodiment consistent with the present disclosure. The voltage regulator with adaptive control 104 is shown as an integrated component of a System on a Chip 402 (SoC). The SoC 402 may further comprise a processor 404, memory 406, an input/output (I/O) system 408, an ADC 410 and any other suitable components not shown for figure clarity. The voltage regulator with adaptive control 104 may provide supply voltage any of the components of the SoC 402, and in particular may provide supply voltage for the ADC 410 which benefits from decreased noise on the supply voltage.

Figure 5:
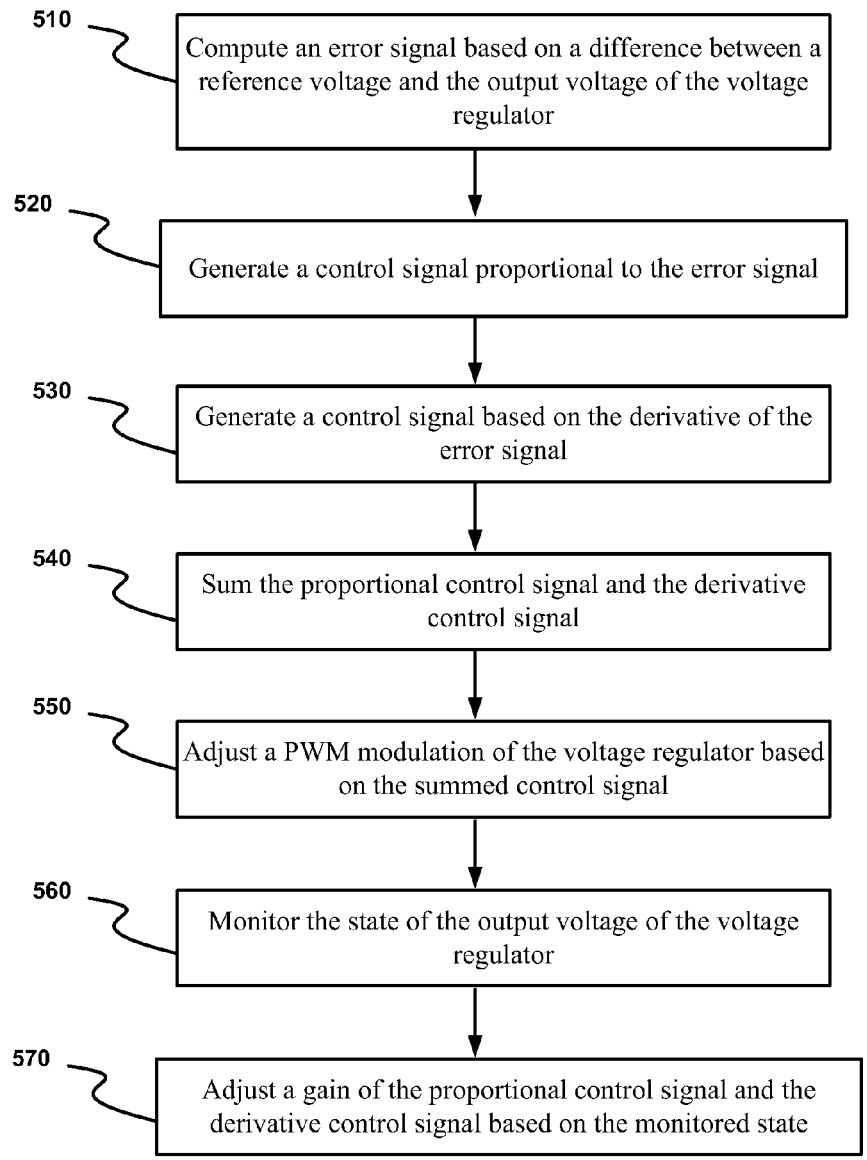
FIG. 5 illustrates a flowchart of operations of an exemplary embodiment consistent with the present disclosure.

FIG. 5 illustrates a flowchart of operations 500 of an exemplary embodiment consistent with the present disclosure. At operation 510, an error signal is computed based on a difference between a reference voltage and the output voltage of the voltage regulator. At operation 520, a control signal is generated proportional to the error signal. At operation 530, a control signal is generated based on the derivative of the error signal. At operation 540, the proportional control signal and the derivative control signal are summed. At operation 550, a PWM modulation of the voltage regulator is adjusted based on the summed control signal. At operation 560, the state of the output voltage of the voltage regulator is monitored. At operation 570, a gain of the proportional control signal and the derivative control signal is adjusted based on the monitored state.

Figure 6:
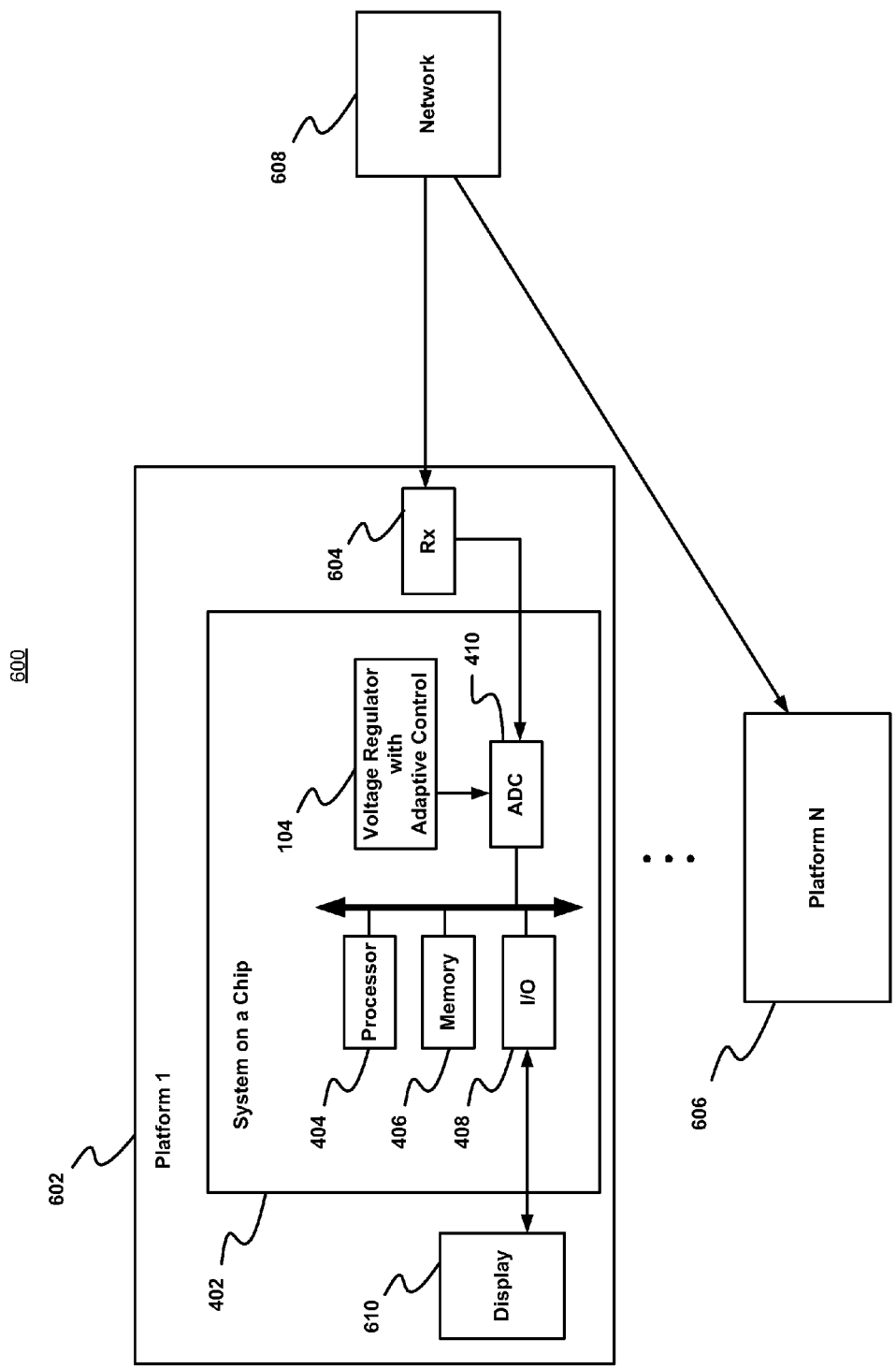
FIG. 6 illustrates a system diagram showing platforms consistent with an exemplary embodiment of the present disclosure in a network.

FIG. 6 illustrates a system diagram 600 showing platforms consistent with an exemplary embodiment of the present disclosure in a network. A platform 602, 606 may be a mobile communication device, such as, for example, a smartphone, a tablet, a digital television, a laptop computing device or any other device configured to transmit or receive modulated signals. In some embodiments, platforms 602, 606 may comprise a System on a Chip 402 (SoC). The SoC 402 may further comprise a processor 404, memory 406, an input/output (I/O) system 408, an ADC 410 and a voltage regulator with adaptive control 104. Platforms 602, 606 may also comprise a receiver (Rx) 604 which may be a demodulating receiver configured to provide an analog signal to ADC 410. In some embodiments, platforms 602, 606 may also comprise a display 610 or other type of user interface (UI) such as, for example, a touchscreen coupled to the SoC 402. Any number of platforms 602, 606 may transmit or receive signals over a network 608. In some embodiments, network 608 may be a Wireless Metropolitan Area Network (WMAN), a Wireless Metropolitan Area Network (WMAN), a digital television network or any other suitable wireless or wired network.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all sub-combinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hard-wired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides an apparatus, method and system for a voltage regulator with adaptive control. The adaptive control may be accomplished by adjusting the gain of the proportional and derivative control circuits based on the state of the output voltage to provide improved response to transition events while decreasing noise on the output voltage. The voltage regulator may be integrated with an SoC which may in turn be part of a mobile communication platform.

According to one aspect there is provided an apparatus. The apparatus may include a differencing circuit configured to generate an error signal based on a difference between a reference voltage and the output voltage of the voltage regulator. The apparatus of this example may also include a proportional control circuit coupled to the differencing circuit, the proportional control circuit configured to generate a control signal proportional to the error signal. The apparatus of this example may further include a derivative control circuit coupled to the differencing circuit, the derivative control circuit configured to generate a control signal based on the derivative of the error signal. The apparatus of this example may further include a summer circuit coupled to the proportional control circuit and the derivative control circuit, the summer circuit configured to sum the proportional control signal and the derivative control signal. The apparatus of this example may further include a PWM signal generator circuit coupled to the summer circuit, the PWM generator circuit configured to adjust the PWM modulation based on the summed control signal. The apparatus of this example may further include a state monitor circuit configured to monitor the state of the output voltage and perform a gain adjustment on the proportional control signal and the derivative control signal based on the monitored state.

Another example apparatus includes the forgoing components and further includes an integral control circuit coupled to the differencing circuit, the integral control circuit configured to generate a control signal based on the integral of the error signal, and the summer circuit configured to sum the integral control signal to the proportional control signal and the derivative control signal.

Another example apparatus includes the forgoing components and the state monitor circuit is further configured to increase the gain adjustment on the derivative control signal in response to detecting that the output voltage enters a transition state.

Another example apparatus includes the forgoing components and the state monitor circuit is further configured to decrease the gain adjustment on the derivative control signal in response to detecting that the output voltage enters a steady state.

Another example apparatus includes the forgoing components and the state monitor circuit is further configured to decrease the gain adjustment on the proportional control signal in response to detecting that the output voltage enters a transition state.

Another example apparatus includes the forgoing components and the state monitor circuit is further configured to increase the gain adjustment on the proportional control signal in response to detecting that the output voltage enters a steady state.

Another example apparatus includes the forgoing components and a minimum value of the gain adjustment and/or a maximum value of the gain adjustment are programmable.

Another example apparatus includes the forgoing components and a transition time between the minimum value of the gain adjustment and the maximum value of the gain adjustment is programmable.

Another example apparatus includes the forgoing components and the voltage regulator is a Buck regulator, a Boost regulator or a Buck-Boost regulator.

According to another aspect there is provided a method. The method may include computing an error signal based on a difference between a reference voltage and the output voltage of the voltage regulator. The method of this example may also include generating a control signal proportional to the error signal. The method of this example may further include generating a control signal based on the derivative of the error signal. The method of this example may further include summing the proportional control signal and the derivative control signal. The method of this example may further include adjusting a PWM modulation of the voltage regulator based on the summed control signal. The method of this example may further include monitoring the state of the output voltage of the voltage regulator. The method of this example may further include adjusting a gain of the proportional control signal and the derivative control signal based on the monitored state.

Another example method includes the forgoing operations and further includes generating a control signal based on the integral of the error signal and summing the integral control signal to the proportional control signal and the derivative control signal.

Another example method includes the forgoing operations and further includes increasing the gain adjustment on the derivative control signal in response to detecting that the output voltage enters a transition state.

Another example method includes the forgoing operations and further includes decreasing the gain adjustment on the derivative control signal in response to detecting that the output voltage enters a steady state.

Another example method includes the forgoing operations and further includes decreasing the gain adjustment on the proportional control signal in response to detecting that the output voltage enters a transition state.

Another example method includes the forgoing operations and further includes increasing the gain adjustment on the proportional control signal in response to detecting that the output voltage enters a steady state.

Another example method includes the forgoing operations and further includes programming a minimum value of the gain adjustment and/or a maximum value of the gain adjustment.

Another example method includes the forgoing operations and further includes programming a transition time between the minimum value of the gain adjustment and the maximum value of the gain adjustment.

According to another aspect there is provided at least one computer-readable storage medium having instructions stored thereon which when executed by a processor, cause the processor to perform the steps of the method as described in the examples above.

According to another aspect there is provided a mobile communication platform. The mobile communication platform may include an SoC including a processor, memory coupled to the processor, an I/O system coupled to the processor, an ADC coupled to the processor and a voltage regulator coupled to the ADC. The platform of this example may also include a display coupled to the SoC. The platform of this example may further include one or more signal receivers coupled to the ADC, wherein the voltage regulator further includes a differencing circuit configured to generate an error signal based on a difference between a reference voltage and the output voltage of the voltage regulator. The voltage regulator of this example may further include a proportional control circuit coupled to the differencing circuit, the proportional control circuit configured to generate a control signal proportional to the error signal. The voltage regulator of this example may further include a derivative control circuit coupled to the differencing circuit, the derivative control circuit configured to generate a control signal based on the derivative of the error signal. The voltage regulator of this example may further include a summer circuit coupled to the proportional control circuit and the derivative control circuit, the summer circuit configured to sum the proportional control signal and the derivative control signal. The voltage regulator of this example may further include a PWM signal generator circuit coupled to the summer circuit, the PWM generator circuit configured to adjust the PWM modulation based on the summed control signal. The voltage regulator of this example may further include a state monitor circuit configured to monitor the state of the output voltage and perform a gain adjustment on the proportional control signal and the derivative control signal based on the monitored state.

Another example system includes the forgoing components and the voltage regulator further includes an integral control circuit coupled to the differencing circuit, the integral control circuit configured to generate a control signal based on the integral of the error signal, and the summer circuit is further configured to sum the integral control signal to the proportional control signal and the derivative control signal.

Another example system includes the forgoing components and the state monitor circuit is further configured to increase the gain adjustment on the derivative control signal in response to detecting that the output voltage enters a transition state.

Another example system includes the forgoing components and the state monitor circuit is further configured to decrease the gain adjustment on the derivative control signal in response to detecting that the output voltage enters a steady state.

Another example system includes the forgoing components and the state monitor circuit is further configured to decrease the gain adjustment on the proportional control signal in response to detecting that the output voltage enters a transition state.

Another example system includes the forgoing components and the state monitor circuit is further configured to increase the gain adjustment on the proportional control signal in response to detecting that the output voltage enters a steady state.

Another example system includes the forgoing components and a minimum value of the gain adjustment and/or a maximum value of the gain adjustment are programmable.

Another example system includes the forgoing components and a transition time between the minimum value of the gain adjustment and the maximum value of the gain adjustment is programmable.

Another example system includes the forgoing components and the voltage regulator is a Buck regulator, a Boost regulator or a Buck-Boost regulator.

Another example system includes the forgoing components and the platform is one of a smartphone, a tablet, a digital television or a laptop computing device.

Another example system includes the forgoing components and a plurality of the platforms are configured to communicate over a network.

Another example system includes the forgoing components and the network is a Wireless Wide Area Network (WWAN).

Another example system includes the forgoing components and the network is a Wireless Metropolitan Area Network (WMAN).

Another example system includes the forgoing components and the network is a digital television network.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A voltage regulator comprising:
   a differencing circuit to generate an error signal based on a difference between a reference voltage and an output voltage of said voltage regulator;
   a proportional control circuit coupled to said differencing circuit, said proportional control circuit to generate a control signal proportional to said error signal;
   a derivative control circuit coupled to said differencing circuit, said derivative control circuit to generate a control signal based on a derivative of said error signal;
   a summer circuit coupled to said proportional control circuit and said derivative control circuit, said summer circuit to sum said proportional control signal and said derivative control signal;
   a pulse width modulated (PWM) signal generator circuit coupled to said summer circuit, said PWM generator circuit to adjust said PWM modulation based on said summed control signal; and
   a state monitor circuit to determine when said output voltage enters a steady state and to adjust a gain of said proportional control signal and said derivative control signal based on said determination, wherein said gain of said derivative control signal is decreased a predetermined programmable period of time after said state monitor circuit determines said output voltage entered said steady state.

2. The voltage regulator of claim 1, further comprising an integral control circuit coupled to said differencing circuit, said integral control circuit generates a control signal based on an integral of said error signal, and wherein said summer circuit sums said integral control signal to said proportional control signal and said derivative control signal.

3. The voltage regulator of claim 1, wherein said state monitor circuit increases said gain adjustment on said derivative control signal in response to determining that said output voltage enters a transition state.

4. The voltage regulator of claim 1, wherein said state monitor circuit decreases said gain adjustment on said proportional control signal in response to determining that said output voltage enters a transition state.

5. The voltage regulator of claim 1, wherein said state monitor circuit increases said gain adjustment on said proportional control signal in response to detecting that said output voltage enters said steady state.

6. The voltage regulator of claim 1, wherein a minimum value of said gain adjustment and a maximum value of said gain adjustment are programmable.

7. The voltage regulator of claim 6, wherein a transition time between said minimum value of said gain adjustment and said maximum value of said gain adjustment is programmable.

8. The voltage regulator of claim 1, wherein said voltage regulator is selected from the group consisting of a Buck regulator, a Boost regulator and a Buck-Boost regulator.

9. A method for adaptively controlling a voltage regulator, said method comprising:

computing an error signal based on a difference between a reference voltage and an output voltage of said voltage regulator;
generating a control signal proportional to said error signal;
generating a control signal based on a derivative of said error signal;
summing said proportional control signal and said derivative control signal;
adjusting a PWM modulation of said voltage regulator based on said summed control signal;
determining a state of said output voltage of said voltage regulator; and
adjusting a gain of said proportional control signal and said derivative control signal based on said determined state, wherein said gain of said derivative control signal is decreased a predetermined programmable period of time after said state monitor circuit determines said output voltage entered a steady state.

10. The method of claim 9, further comprising generating a control signal based on an integral of said error signal and summing said integral control signal to said proportional control signal and said derivative control signal.

11. The method of claim 9, further comprising increasing said gain adjustment on said derivative control signal in response to determining that said output voltage enters a transition state.

12. The method of claim 9, further comprising decreasing said gain adjustment on said proportional control signal in response to determining that said output voltage enters a transition state.

13. The method of claim 9, further comprising increasing said gain adjustment on said proportional control signal in response to determining that said output voltage enters said steady state.

14. The method of claim 9, further comprising programming a minimum value of said gain adjustment and a maximum value of said gain adjustment.

15. The method of claim 14, further comprising programming a transition time between said minimum value of said gain adjustment and said maximum value of said gain adjustment.

16. One or more non-transitory computer-readable memories which store, singularly or in combination, instructions which when executed by at least one processor result in the following operations for estimating receiver noise variance, said operations comprising:
computing an error signal based on a difference between a reference voltage and an output voltage of said voltage regulator;
generating a control signal proportional to said error signal;
generating a control signal based on a derivative of said error signal;
summing said proportional control signal and said derivative control signal;
adjusting a PWM modulation of said voltage regulator based on said summed control signal;
determining a state of said output voltage of said voltage regulator; and
adjusting a gain of said proportional control signal and said derivative control signal based on said determined state, wherein said gain of said derivative control signal is decreased a predetermined programmable period of time after said state monitor circuit determines said output voltage entered a steady state.

17. The one or more non-transitory computer-readable memories of claim 16, wherein said operations further comprise generating a control signal based on an integral of said error signal and summing said integral control signal to said proportional control signal and said derivative control signal.

18. The one or more non-transitory computer-readable memories of claim 16, wherein said operations further comprise increasing said gain adjustment on said derivative control signal in response to determining that said output voltage enters a transition state.

19. The one or more non-transitory computer-readable memories of claim 16, wherein said operations further comprise decreasing said gain adjustment on said proportional control signal in response to determining that said output voltage enters a transition state.

20. The one or more non-transitory computer-readable memories of claim 16, wherein said operations further comprise increasing said gain adjustment on said proportional control signal in response to determining that said output voltage enters said steady state.

21. The one or more non-transitory computer-readable memories of claim 16, wherein said operations further comprise programming a minimum value of said gain adjustment and a maximum value of said gain adjustment.

22. The one or more non-transitory computer-readable memories of claim 21, wherein said operations further comprise programming a transition time between said minimum value of said gain adjustment and said maximum value of said gain adjustment.

23. A mobile communication platform comprising:
a system on a chip (SoC) including a processor, memory coupled to said processor, an input/output (I/O) system coupled to said processor, an analog to digital converter (ADC) coupled to said processor and a voltage regulator coupled to said ADC;
a display coupled to said SoC; and
one or more signal receivers coupled to said ADC;
wherein said voltage regulator comprises:
a differencing circuit to generate an error signal based on a difference between a reference voltage and an output voltage of said voltage regulator;
a proportional control circuit coupled to said differencing circuit, said proportional control circuit to generate a control signal proportional to said error signal;
a derivative control circuit coupled to said differencing circuit, said derivative control circuit to generate a control signal based on a derivative of said error signal;
a summer circuit coupled to said proportional control circuit and said derivative control circuit, said summer circuit to sum said proportional control signal and said derivative control signal;
a PWM signal generator circuit coupled to said summer circuit, said PWM generator circuit to adjust said PWM modulation based on said summed control signal; and
a state monitor circuit to determine when said output voltage enters a steady state and to adjust a gain of said proportional control signal and said derivative control signal based on said determination, wherein said gain of said derivative control signal is decreased a predetermined programmable period of time after said state monitor circuit determines said output voltage entered said steady state.

24. The mobile communication platform of claim 23, wherein said voltage regulator further comprises an integral control circuit coupled to said differencing circuit, said integral control circuit generates a control signal based on an integral of said error signal, and wherein said summer circuit sums said integral control signal to said proportional control signal and said derivative control signal.

25. The mobile communication platform of claim 23, wherein said state monitor circuit increases said gain adjustment on said derivative control signal in response to determining that said output voltage enters a transition state.

26. The mobile communication platform of claim 23, wherein said state monitor circuit decreases said gain adjustment on said proportional control signal in response to detecting that said output voltage enters a transition state.

27. The mobile communication platform of claim 23, wherein said state monitor circuit increases said gain adjustment on said proportional control signal in response to determining that said output voltage enters said steady state.

28. The mobile communication platform of claim 23, wherein a minimum value of said gain adjustment and a maximum value of said gain adjustment are programmable.

29. The mobile communication platform of claim 28, wherein a transition time between said minimum value of said gain adjustment and said maximum value of said gain adjustment is programmable.

30. The mobile communication platform of claim 23, wherein said voltage regulator is selected from the group consisting of a Buck regulator, a Boost regulator and a Buck-Boost regulator.

31. The mobile communication platform of claim 23, wherein said platform is one of a smartphone, a tablet, a digital television or a laptop computing device.

32. The mobile communication platform of claim 23, further comprising a plurality of said platforms each configured to communicate over a network.

33. The mobile communication platform of claim 32, wherein said network is a Wireless Wide Area Network (WWAN).

34. The mobile communication platform of claim 32, wherein said network is a Wireless Metropolitan Area Network (WMAN).

35. The mobile communication platform of claim 32, wherein said network is a digital television network.

* * * * *